United States Patent [19]
Selmeczi et al.

[11] 3,855,391

[45] Dec. 17, 1974

[54] SLUDGE STABILIZATION WITH GYPSUM

[75] Inventors: Joseph G. Selmeczi, Pittsburgh;
Daniel W. Kestner, Coraopolis, both of Pa.

[73] Assignee: Dravo Corporation, Pittsburgh, Pa.

[22] Filed: Jan. 23, 1973

[21] Appl. No.: 326,020

[52] U.S. Cl................ 423/242, 106/110, 423/171, 423/555
[51] Int. Cl. ................... C01b 17/60, C04b 11/02
[58] Field of Search .......... 423/161, 166, 171, 242, 423/244, 554, 555, 558, 170; 106/109, 110

[56] References Cited
UNITED STATES PATENTS

| | | | |
|---|---|---|---|
| 1,609,872 | 12/1926 | Garner et al. | 423/242 |
| 1,820,455 | 8/1931 | Hooey | 423/555 |
| 2,090,142 | 8/1937 | Nonhebel et al. | 423/242 |
| 3,514,281 | 5/1970 | McKie | 423/530 |
| 3,582,376 | 6/1971 | Ames | 106/109 X |

FOREIGN PATENTS OR APPLICATIONS

| | | | |
|---|---|---|---|
| 454,239 | 9/1936 | Great Britain | 423/170 |
| 396,969 | 8/1933 | Great Britain | 423/242 |

OTHER PUBLICATIONS

Iowa State University Bulletin No. 193, Dec. 1960, pp. 338–340, Soil Stabilization with Chemicals.

Iowa State University Bulletin No. 194, Feb. 1961, pp. 71–75, Soil Stabilization with Cement.

*Primary Examiner*—Ocar R. Vertiz
*Assistant Examiner*—Gary P. Straub
*Attorney, Agent, or Firm*—Parmelee, Miller, Welsh & Kratz

[57] ABSTRACT

A sulfur dioxide scrubber waste sludge is stabilized using plaster of paris to produce a stable landfill material. The scrubbing liquor is provided with a catalyst which optimizes the production of calcium sulfate as a solid sulfur compound in the scrubber waste. The calcium sulfate is separated from the waste sludge and converted by heating to plaster of paris, which is remixed with the sludge to stabilize the material as a landfill.

4 Claims, No Drawings

SLUDGE STABILIZATION WITH GYPSUM

BACKGROUND OF THE INVENTION

Burning of sulfur containing fuels in power plants produces sulfur dioxide emissions which are a disturbing pollution problem. Several of the sulfur dioxide removal systems are basically formed by scrubbing with an aqueous solution containing alkaline compounds either in solution or as a solid containing slurry. The alkaline compounds typically used are limestone, i.e. calcium carbonate, or lime either in the lime or hydrated state. These calcium compounds will react with the sulfur dioxide to form calcium sulfate which is gypsum $CaSO_4\text{-}2H_2O$ and calcium sulfite $CaSO_3\text{-}\frac{1}{2}H_2O$. The specific ratios of these two compounds will depend upon a variety of factors in the scrubbing system. The resultant water slurry will also contain some particulate material removed from the gases and excess alkaline material added.

The double alkali sulfur dioxide removal system also uses an alkali regeneration system which produces very similar calcium sulfate and calcium sulfite waste containing sludges.

The calcium sulfate and calcium sulfite containing waste sludges produced by these scrubbing systems present a difficult handling and disposal problem both because of the retention of water by these very fine particulate materials. The calcium sulfate and calcium sulfite crystals are platelet like crystals which are attached together in random fashion providing a high surface area composite particle which exhibits a very low mass to volume ratio. This material exhibits a thixotropic characteristic, i.e., virtually impossible to greatly reduce the water content. It has been observed that sludges of this waste material if disposed in a pond or lake will not stabilize but rather will remain as a sludge destroying the utility of the ground surface which it covers and representing a potential hazard to life and property.

SUMMARY OF THE INVENTION

A convenient and economical way of disposing of wastes from the sulfur fuel burning power plants is detailed utilizing a sulfur dioxide scrubber which generates finely divided calcium sulfite and calcium sulfate compounds as waste products which are included in aqueous sludge which is collected for disposal. The method utilizes plaster of paris as a stabilizing agent for sludge to provide a stable landfill material. Plaster of paris is conveniently produced from calcium sulfate so that the formation of calcium sulfate in the scrubber waste product is optimized.

The optimization of calcium sulfate is provided by incorporating predetermined concentrations of selected oxidizing catalysts in the scrubbing solution, which catalyst is selected to insure that a high percentage of calcium sulfate is formed. A portion of the discharged calcium sulfate containing sludge is separated and dried and treated from about 260°–360°F for a time sufficient to convert the calcium sulfate to plaster of paris. The plaster of paris so produced is admixed with the remainder of the generated sludge in an amount of about 1 to 20 weight percent plaster of paris per total solids in the sludge. The admixed sludge is further dewatered and cured to stabilize the solids therein as a landfill material. Fuel residue such as fly ash can also be included in the sludge material with the fly ash contributing to the stabilization of the sludge.

The selective catalysts are preferably maganese oxide, ferric oxide, and nickel, cobalt or copper salts, such as sulfates, nitrates, chlorides and oxides. These are incorporated in an amount of from about 0.1–1,000 parts per million of the scrubbing liquor depending on the catalysts used. Cobalt is effective at very low concentration levels.

DESCRIPTION OF THE PREFERRED EMBODIMENT

A variety of sulfur dioxide scrubber systems utilizing alkali or alkaline earth metal compounds can be utilized in practicing the present invention. By way of example, the sulfur dioxide scrubber can comprise a venturi type wet scrubber in which hydrated lime or calcium hydroxide is dissolved in the aqueous scrubber liquor. The sulfur dioxide containing fuel gas is evolved from the combustion of sulfur containing fuel and passed through the scrubber system. The catalyst of manganese or iron oxide in an amount of about 10–1,000 parts per million concentration is included in the scrubbing liquor. The addition of these catalysts will ensure a high percentage of the calciumsulfur compounds formed during the removal of the suflur dioxide will be formed as calcium sulfate. Calcium sulfate is the oxidized or gypsum phase which has the formula $CaSO_4\text{-}2H_2O$.

A portion of the calcium sulfate containing sludge is separated, for example about twenty volume percent, and dried and heated to a temperature of about 260°–360°F for a time sufficient to convert the calcium sulfate $CaSO_4\text{-}2H_2O$ to plaster of paris $CaSO_4\text{-}\frac{1}{2}H_2O$.

The plaster of paris is then admixed with the remainder of the sulfate containing sludge to stabilize the sludge. The plaster of paris is preferably added in an amount of about 1–20 percent by weight of the total solids weight in the sludge.

The following data gives an indication of the stabilization of sulfate-sulfite containing sludges which can be achieved utilizing the present invention.

| Sludge A - Containing About 48 wt % of Fly Ash |||||
|---|---|---|---|---|
| Percentage of Solids in Mixture | Percentage of Plaster of Paris Additive | Unconfined Strength tons/ft² |||
| | | One Day | Three Days | One Week |
| 40% | 20% |  | 0.25 | 0.75 |
| 40% | 25% | 0.75 | 0.75 | 0.75 |
| 40% | 50% | 3.75 | 3.75 | 4 |

The unconfined compressive strength in tons per square foot was taken using a soil penetrometer, model

| Sludge B - Containing About 65 wt % Fly Ash | | | | |
|---|---|---|---|---|
| Percentage of Solids in Mixture | Percentage of Plaster of Paris Additive | Unconfined Strength tons/ft² | | |
| | | One Day | Three Days | One Week |
| 50% | 3.5 | | 0.25 | 1.8 |
| 50% | 10 | 0.75 | | 1.8 |
| 50% | 20 | 3 | 3.25 | 3.5 |

| Sludge C - Containing About 85 wt % Fly Ash | | | | |
|---|---|---|---|---|
| Percentage of Solids in Mixture | Percentage of Plaster of Paris Additive | Unconfined Strength tons/ft² | | |
| | | One Day | Three Days | One Week |
| 60% | 3.5 | 0.75 | 1.75 | 2.5 |
| 60% | 10 | 2 | | 2.5 |
| 60% | 20 | 4.25 | | 4.5 |

CL-700, manufactured by Soiltest Corp. of Chicago, where the samples were set up in tubular containers. The samples tested for the test data above were allowed to set up in an open tube several inches in diameter, with supernatant fluid allowed to remain on the surface of the sample, or were set in sealed plastic containers with any separated fluid retained therein.

The plaster of paris admixed with the sludge and cured will remove a certain portion of the free water contained in the sludge as the water is taken up as the plaster of paris hydrates.

For a coal burning power station a significant amount of fly ash is evolved from the combustion of the coal. The fly ash can then be separated using a dry precipitator or can be removed from the flue gases in the wet scrubber along with the sulfur dioxide. It is desirable to have a certain portion of fly ash included with the calcium sulfur solid waste containing sludge. Fly ash is typically present in an amount of about 25–75 weight percent with the greater percentage of fly ash contained the greater the degree of stabilization of the landfill material. The higher the solids content of the sludge the less plaster of paris required to achieve a given strength, and the rate of reaction at a given plaster content increases with increased solids weight percent.

It is desirable to utilize the residual heat content of the flue gases for the drying and heating of the sludge, which is then calcined to produce plaster of paris.

By removing the fly ash by means of a separate dry precipitator prior to scrubbing the formation of calcium sulfate in the scrubber can be optimized, and this will reduce the amount of material which has to be handled and dried in converting the sulfate to plaster of paris. The dry collected fly ash can be later admixed with the plaster of paris containing sludge to further increase the stability of the final material.

We claim:

1. Method of disposing of wastes from a sulfur-fuel burning power plant utilizing a sulfur dioxide scrubber which generates finely divided calcium-sulfur compound containing waste products which are disposed in an aqueous sludge which is collected for disposal, the method comprising:
   a. incorporating 0.1–1000 parts per million of finely divided oxidizing catalyst selected from the group comprising manganese, ferric, nickel, cobalt and copper oxides, and sulfate, nitrate and chloride salts of nickel, cobalt and copper, in the scrubbing liquor, which catalyst is selected to ensure that a high percentage of calcium sulfate is formed in the scrubber;
   b. separating a portion of between 1–20 percent of the discharged calcium sulfate containing sludge from the remainder, drying said portion and treating the dried calcium sulfate at from 260°–360°F for a time sufficient to convert the calcium sulfate to plaster of paris;
   c. admixing the plaster of paris with the remainder of the generated sludge, and
   d. dewatering and curing the admixed sludge to stabilize the solids therein as a landfill material.

2. The method specified in claim 1, wherein coal fly ash is also contained in the sludge.

3. The method specified in claim 1, wherein the waste heat contained in the flue gas is used to heat the calcium sulfate to convert same to plaster of paris.

4. The method specified in claim 1, wherein the plaster of paris is admixed in an amount of about 1–20 weight percent of the total solids weight in the sludge.

* * * * *